Oct. 18, 1955    A. WARTO    2,720,928
AIRCRAFT PROPELLER

Filed June 30, 1950    3 Sheets-Sheet 3

INVENTOR.
Aristides Warto
BY
ATTORNEYS

United States Patent Office 2,720,928
Patented Oct. 18, 1955

2,720,928

AIRCRAFT PROPELLER

Aristides Warto, Cruzeiro, Brazil

Application June 30, 1950, Serial No. 171,265

10 Claims. (Cl. 170—165)

The present invention relates to improvements in propellers for airplanes, and more particularly to an improved propeller blade and a blade unit comprising two blades, a plurality of such units being employed on a single propeller.

The principal object of my invention is to provide an improved propeller for aircraft having a structure and arrangement adapted to provide a maximum possible yield with a minimum of power required, with a complete absence of shock stall thus contributing to an excellent performance.

According to my invention each propeller unit of the propeller contains two concave and convex blades, one of them in front of the other, i. e., they are disposed as a pair, the front blade being disposed slightly in advance of the rear blade, and the rear blade having a positive blade angle of six degrees larger than the blade angle of the front blade. The blades are united by means of a coupling and they form a variable pitch single unit, the aerodynamic effect of which, by virtue of the different degrees of the lines of the leading edges, back side and trailing edges, together with the resulting symmetry, is that of suction, due to which shock stall is neutralized.

The back surfaces of the improved blades are concave and are provided with inwardly projecting claw-like lips respectively adjacent their leading and trailing edges, these lips having the property of retaining air currents during the operation of the propeller and of creating a pressure resulting in increased lift.

The rear blade is broad at the hub and has a more accentuated cup-like concavity than the other blade of the unit, which has the property of receiving the rotating air at the back of the blade and accumulating it under pressure to a definite advantage. This blade because of its shape, together with a single thickness through the whole length of the blade, offers a resistance to distortion and bending while in use.

According to my invention the center of gravity of the front blade lies behind the center of pressure of this blade, the reverse of this being true of the rear blade, that is, the center of gravity of the rear blade lies in front of its center of pressure and thus, while rotating, neutralizes vibrations and the whole enters into perfert equilibrium.

The blades of this new type of propeller are disposed such as to be tilted to the front ten and a half degrees from a plane perpendicular to the axis of the propeller, in order to catch, in the shape of a funnel in front of the propeller, the air attracted by the propeller and thus the vortex produced by suction or attraction of the propeller is perfect and does not produce any shocks or deviations which is a predominating factor cooperating to produce a minimum of noise and absence of shock stall. This tilted arrangement combined with the action of the rear blade, having a blade angle of forty-seven degrees, gives superior results in speed and economy.

My improved invention includes other features, objects and advantages as described more in detail hereinafter in connection with the accompanying drawings forming a part of this application.

Figure 1:
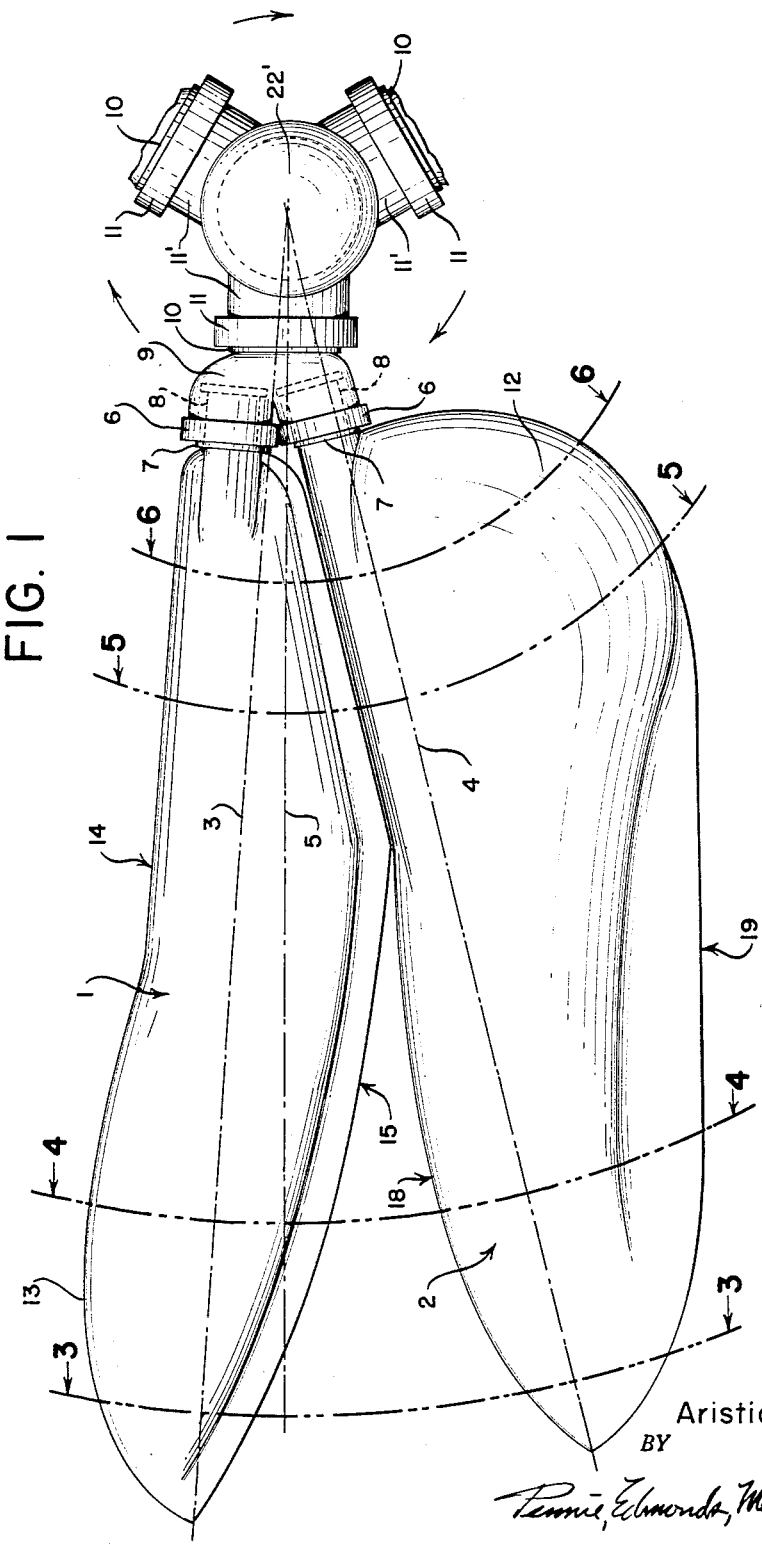
Fig. 1 is a front elevational view of a three unit propeller constructed in accordance with my invention, with two units broken away, showing the front surfaces and relationship of the two propeller blades of a unit, and the direction of rotation by arrows.

Figs. 3, 4, 5 and 6 are respectively cross-sectional views of the two propeller blades constituting the propeller blade unit shown in Fig. 1 taken respectively at the positions along the blades of the arcuate lines 3—3, 4—4, 5—5 and 6—6, the arcuate lines having the axis of the propeller as a common center.

Figure 2:
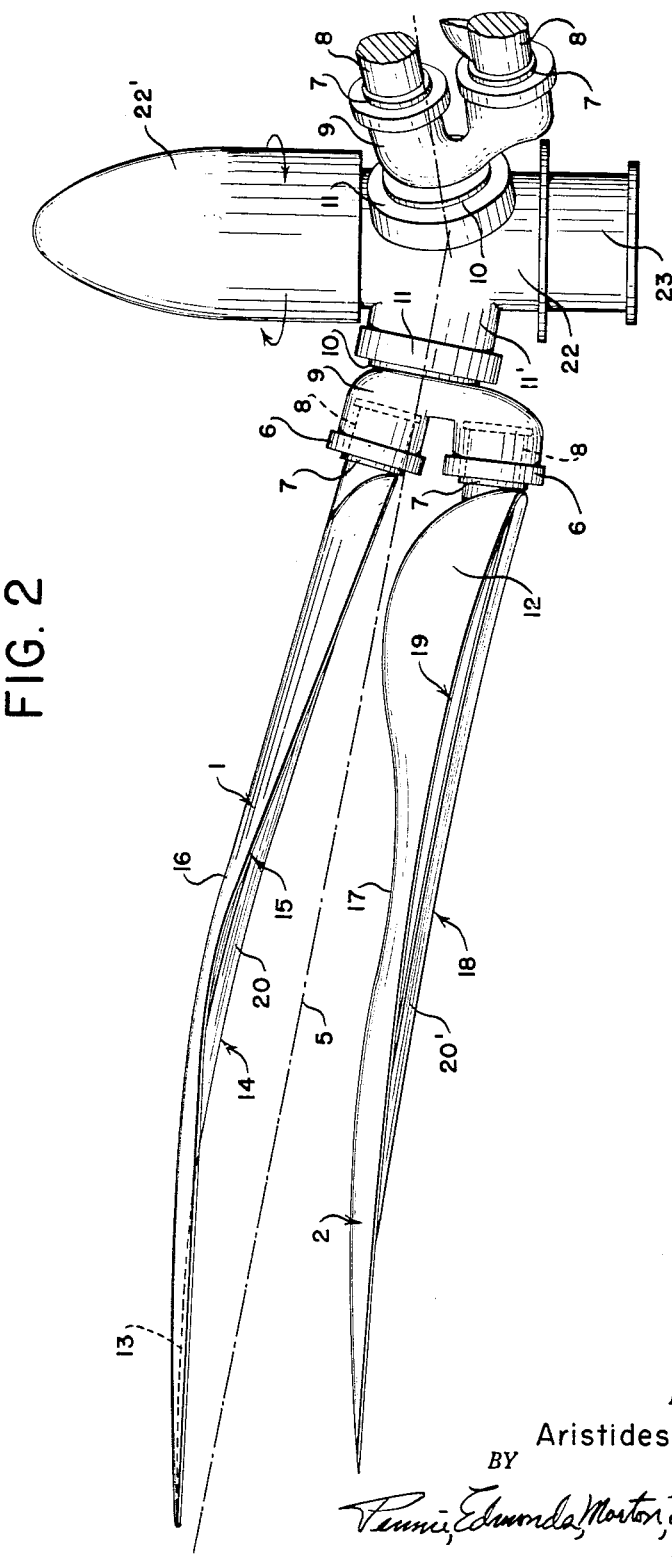
Fig. 2 is an elevational view of the propeller shown in Fig. 1, with parts broken away, looking toward the trailing edges of the two propeller blades of the propeller blade unit shown in Fig. 1, the direction of rotation being indicated by arrows on the propeller hub.
Figure 3:
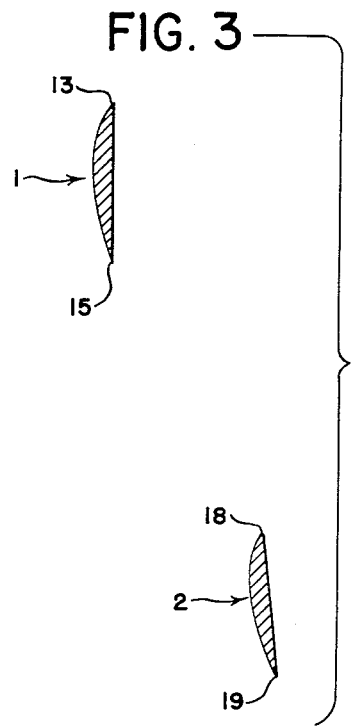
Figure 4:
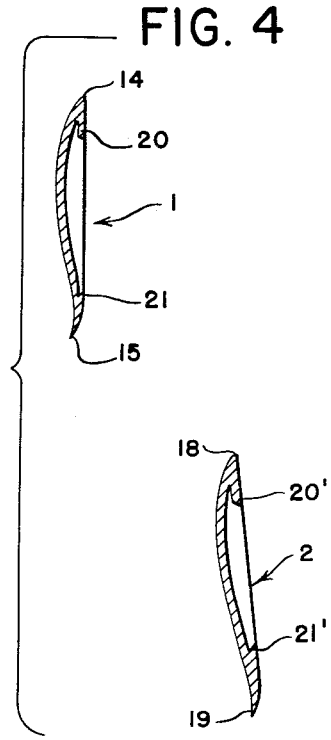
Figure 5:
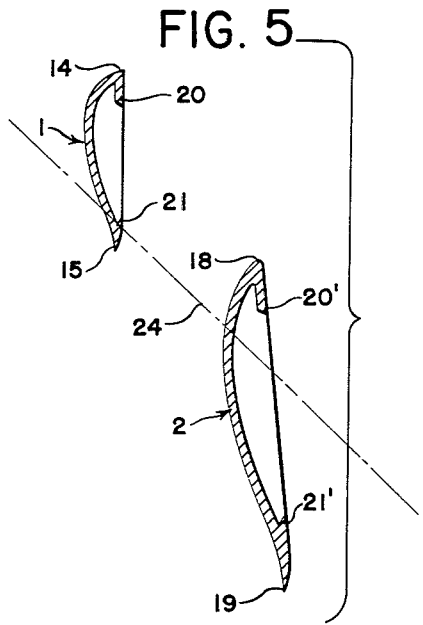
Figure 6:
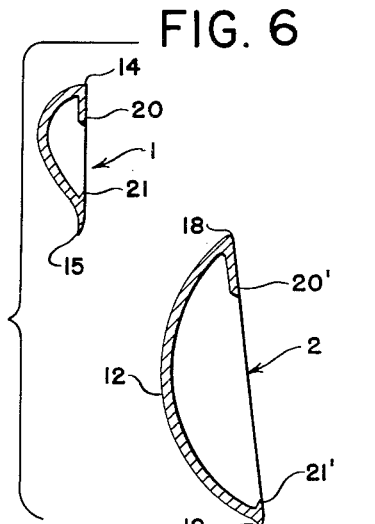

Referring to the drawings, the numeral 1 indicates the front and leading blade of the two blade unit, 2 the rear blade, 3 a dot-and-dash line representing the center of gravity of the front blade 1, 4 a dot-and-dash line representing the center of gravity of the rear blade 2, 5 a dot-and-dash line representing the center of gravity of both blades, i. e., of the propeller blade unit proper, 6 the collars of a coupling 9 for uniting the blades 1 and 2 forming the propeller blade unit 7, retaining washers connecting the blades 1 and 2 to the coupling 9, 8 the propeller blade roots extending into the coupling 9 uniting and retaining the blades, 10 retaining washers connecting the couplings 9 to the propeller hub sockets 11' each having a cuff or collar 11, 12 the curved or shell-shaped portion of the rear blade 2 close to its root (see Fig. 6), 13 the leading edge at the tip portion of the front blade 1, 14 the main portion of the leading edge of the front blade, of which 13 is a continuation, 15 the trailing edge of the front blade, 16 in Fig. 2 the forward contour line of the front blade, 17 in Fig. 2 the forward contour line of the rear blade, 18 the leading edge of the rear blade, 19 the trailing edge of the rear blade, 20 and 20', respectively, the projecting claw-like lips on the backs of the blades 1 and 2 along their leading edge portions (see Figs. 4, 5 and 6), 21 and 21', respectively, the projecting claw-like lips on the backs of the blades 1 and 2 along their trailing edge portions (see Figs. 4, 5 and 6), and 22 a propeller hub having the three propeller hub sockets 11', a propeller cap or nose 22' and a base 23 for attachment to a propeller shaft.

Considering the foregoing elements of the improved construction in greater detail, the blades 1 and 2 forming the propeller blade units comprise a group of two radially-extending blades forming an assembly or a unit having the aerodynamic effect described above. By means of a structure and arrangement indicated by the lines 3, 4 and 5, which converge exactly toward the center or axis of the hub 22, the elimination of vibrations produced by dynamic and aerodynamic forces is ensured. Since the line 5 indicates the center of gravity of the propeller blade unit, the line 4 the center of gravity of the rear blade and the line 3 the center of gravity of the front blade, it will be seen that the stresses are well combined and scientifically distributed. In this arrangement the center of gravity of the front blade 1 is behind its center of pressure, the reverse being true of the rear blade, i. e., its center of gravity lies in front of its center of pressure, and this, combined with the difference of more than six degrees of positive angle of incidence between the front and rear blades, relative to the axis of the propeller, eliminates vibrations when the propeller is rotating, all of which contributes to a perfect equilibrium.

The cross-sectional views in Figs. 3 to 6 show that the blades have essentially one single thickness in order to maintain a homogeneous elasticity in the whole extent of the blades, to offer a resistance to distortion and bending to offer the required strength for heavy duty services and to provide a minimum of weight, these being important factors both as to propellers and as to aviation generally.

The retaining washer 10 uniting coupling 9 to the hub of the propeller by means of cuff or collar 11, has the property of permitting free movement to the propeller blade unit in all of the convenient degrees for changing its pitch, up to feathering. The curvature indicated at 12 in Figs. 2 and 6 near the root of the rear blade 2, is such as to be approximately a cup or shell and has the property of ensuring a high resistance of this blade to distortion and bending, and of contributing other beneficial effects.

The leading and trailing edges and contour lines of the blades represented by the lines 13, 14, 15, 16, 17, 18 and 19, as shown in Fig. 2, respectively, at 3½ degrees, 21 degrees, 21 degrees, 16 degrees, 7 degrees, 14 degrees and 21 degrees, with respect to a vertical plane perpendicular to the axis of the propeller, represent an aerodynamic refinement which, in cooperation and harmony with the disclosed symmetry of the blades, avoid friction with the air directing, with the required precision, the air currents in their different speeds and pressures, removing by means of suction the air present at the front of the leading edges of both blades and still, by means of suction, removing the layer of air from the back side of the front blade and, by means of pressure and expansion, expelling the air layer from the back side of the rear blade thus forming, by virtue of the gap between the blades, a continuous syphon of suction reducing drag to a minimum much less than if there existed only a single blade.

The projecting claw-like lips 20 and 20' adjacent the leading edges of the blades together with trailing edge lips 21 and 21' on the back of the blades, according to my understanding, form a self-rotating pad of super-pressure air, since, as air is displaced along the chord of one of the blades it strikes against the lip 21, or 21', and, in view of the force and aerodynamic effect of this shock, air returns with nearly doubled speed to the lip 20, or 20', thus producing a highly compressed self-rotation which converges and flows away in the direction of the hub of the propeller, thereby increasing the lift to a maximum.

The pitch of the propeller blade units of the present invention may be changed to increase the yield from the propeller. For example, maximum yield may be obtained by changing the pitch of the propeller blade units so that the front blade 1 has an angle of incidence of 47° and the rear blade 2 has an angle of incidence of 41°, both with respect to the axis of the propeller. This pitch of the blades of a unit for maximum yield may be visualized from the showing in Fig. 5, for example, where the dot-and-dash line 24 represents the direction of the axis of the propeller when the blades 1 and 2 are respectively at the above angles of incidence.

The line 5 in Fig. 2, representing the center of gravity of the propeller's centrifugal force, is the same line of force along which air converges from the periphery to the center, and extends forward at an angle of ten and a half degrees (10.5°) to a plane perpendicular to the axis of the propeller hub. During the rotation of the propeller the center of gravity represented by the line 5 in Fig. 2 describes a conical surface of rotation, the forward tilt of the blade units having the property of catching the air attracted by the propellers, in a funnel or cone-like shape, against the propeller and whirling it, in accordance with my understanding, in a sense opposed to the propeller's rotation; thus the vortex formed by attraction and passage of the propeller is perfect and produces neither shocks nor deviations, which is a predominating factor cooperating for a larger yield, a minimum of noise and the absence of shock stall.

Nowadays propellers in use are simple, single, of simple effect and single-bladed as commonly they are seen utilized in aviation all over the world; therefore I present the new type with new features called double-acting propeller.

I claim:

1. In a propeller for aircraft, a propeller blade having a concave back surface extending lengthwise of the blade, a projecting claw-like lip adjacent both the leading and trailing edges on the back of said blade extending lengthwise thereof and bordering said concave surface, said lips extending toward each other over portions of the concave back surface of the blade, whereby the back of the blade has the property of retaining air currents during the operation of the propeller and of creating a pressure resulting in increased lift.

2. A propeller blade as claimed in claim 1, in which the leading edge portion of the blade comprises a convex curved front surface extending from the leading edge, and a straight flat surface on the back of the blade extending from the leading edge to the edge of the lip on the back of the blade projecting toward the trailing edge from the leading edge of the blade.

3. A propeller blade as claimed in claim 1 in which the trailing edge portion of the blade comprises a slightly concave curved front surface extending from the trailing edge toward the leading edge of the blade, and a slightly convex curved surface on the back of the blade extending from the trailing edge of the blade to the edge of the lip on the back of the blade projecting toward the leading edge from the trailing edge of the blade.

4. In a propeller for aircraft including a plurality of propeller blade units, each unit comprising two blades coupled together at their inner ends in a fixed relation with respect to each other, one of the blades of the unit being located in front of the other blade with the front blade leading the rear blade in the direction of rotation of the propeller, the center of gravity of the front blade being located behind its center of pressure, and the center of gravity of the rear blade being located in front of its center of pressure, whereby a balanced blade unit is provided which in operation is substantially free of vibration.

5. A propeller for aircraft as claimed in claim 4, in which the rear blade of each blade unit has a positive blade angle 6° greater than that of the front blade of said unit.

6. A propeller for aircraft as claimed in claim 4, in which each blade of each unit has a concave back surface extending lengthwise of the blade, a projecting claw-like lip adjacent both the leading and the trailing edges on the back of said blade extending lengthwise thereof in spaced relation and bordering said concave surface, said lips projecting toward each other over portions of the concave back surface of the blade, whereby the back of the blades have the property of retaining air currents during the operation of the propeller and of creating a pressure resulting in increased lift.

7. A propeller as claimed in claim 4, in which one of the blades of each unit is located to the rear of the other blade and the rear blade is of uniform thickness substantially throughout its length, said rear blade being broader at its inner end than at its outer end and having a concave back surface extending lengthwise of the blade the concavity of which is more accentuated adjacent its inner end than at its outer end.

8. In a propeller for aircraft including a propeller hub, a plurality of propeller blade units attached to the hub, each propeller blade unit comprising two substantially straight blades coupled together at their inner ends in a fixed relation with respect to each other, one of the blades of the unit being located in front of the other blade with the front blade leading the rear blade in the direction of rotation of the propeller, each propeller blade unit being inclined toward the front of the propeller and attached to the propeller hub at an angle of 10½° with respect to a plane perpendicular to the axis of the hub of the propeller.

9. A propeller as claimed in claim 8 in which each blade of the propeller blade unit has a concave back surface extending lengthwise of the blade, a projecting claw-like lip adjacent both the leading and trailing edges on the back of each blade extending lengthwise thereof in spaced relation and bordering said concave surface, the lips of each blade extending toward each other over portions of the concave surface of the blade, whereby in the operation of the propeller air is caught between said lips and caused to whirl and to move in a direction along the blades toward the hub of the propeller thereby substantially preventing shocks and the shock stall of the propeller.

10. In a propeller for aircraft including a propeller hub, a plurality of propeller blade units attached to the hub, each propeller blade unit comprising a pair of propeller blades mounted in fixed relation with respect to each other, a coupling means attached to the hub for each blade unit and having separate means for attaching the pair of blades of said blade unit thereto, one of the blades of the propeller blade unit being located entirely in front of the other blade thereby providing front and rear blades in each unit with the front blade leading the rear blade in the direction of rotation of the propeller but being adjacent thereto in said direction, each blade of each unit having a concave back surface extending lengthwise of the blade, and a projecting claw-like lip adjacent both the leading and trailing edges on the back of each blade of each unit, the projecting lips of each blade extending lengthwise thereof in spaced relation and bordering said concave surface, said lips projecting toward each other over portions of the concave surface of the blade, whereby each blade has the property of retaining air currents during the operation of the propeller and of creating a pressure resulting in increased lift.

References Cited in the file of this patent

UNITED STATES PATENTS

| | | |
|---|---|---|
| 1,014,730 | Way | Jan. 16, 1912 |
| 1,243,885 | Smyth | Oct. 23, 1917 |
| 1,463,441 | Pike | July 31, 1923 |
| 1,623,868 | Fischer | Apr. 5, 1927 |
| 1,864,492 | Krasnodmsky | June 21, 1932 |
| 1,949,611 | Martens et al. | Mar. 6, 1934 |
| 2,175,609 | Leeb | Oct. 10, 1939 |
| 2,451,106 | Martin | Oct. 12, 1948 |
| 2,587,247 | Turner | Feb. 26, 1952 |

FOREIGN PATENTS

| | | |
|---|---|---|
| 16,687 | Great Britain | 1912 |
| 27,763 | Great Britain | of 1913 |
| 159,207 | Great Britain | May 22, 1922 |
| 237,619 | Great Britain | 1927 |
| 900,353 | France | June 27, 1945 |